United States Patent [19]

Clarke

[11] 4,180,539

[45] Dec. 25, 1979

[54] EXTRUSION PROCESS FOR AUTOMATICALLY THREADING LACES

[75] Inventor: Kenneth Clarke, Knebworth, England

[73] Assignee: Automatik Apparate-Maschinenbau H. Hench GmbH, Grossostheim, Fed. Rep. of Germany

[21] Appl. No.: 855,458

[22] Filed: Nov. 28, 1977

Related U.S. Application Data

[63] Continuation of Ser. No. 653,149, Jan. 28, 1976, abandoned, which is a continuation of Ser. No. 473,269, May 24, 1974, abandoned, which is a continuation of Ser. No. 242,367, Apr. 10, 1972, abandoned.

[30] Foreign Application Priority Data

Apr. 14, 1971 [GB] United Kingdom ............... 9350/71
Feb. 22, 1972 [GB] United Kingdom ............... 8108/72

[51] Int. Cl.² .............................................. B29F 3/00
[52] U.S. Cl. .................................. 264/143; 264/180; 425/71
[58] Field of Search ............ 264/140, 141, 143, 178 F, 264/180, 181, 216; 425/71

[56] References Cited

U.S. PATENT DOCUMENTS

| | | | |
|---|---|---|---|
| 1,683,478 | 9/1928 | Neidich | 264/180 X |
| 2,027,419 | 1/1936 | Dreyfus | 264/181 |
| 2,254,203 | 9/1941 | Bender | 425/71 X |
| 2,324,397 | 8/1943 | Hull | 264/180 |
| 2,619,677 | 12/1952 | Ryan | 264/180 |
| 3,076,999 | 2/1963 | Washburn | 425/316 |
| 3,436,792 | 4/1969 | Hench | 425/72 R |
| 3,723,035 | 3/1973 | Franke | 425/71 |

FOREIGN PATENT DOCUMENTS

| | | | |
|---|---|---|---|
| 518124 | 3/1953 | Belgium | 425/71 |
| 812709 | 5/1937 | France | 425/71 |

Primary Examiner—Thomas P. Pavelko
Attorney, Agent, or Firm—Cushman, Darby & Cushman

[57] ABSTRACT

A quenching system for extrudates e.g. extruded laces consists of an inclined open ended trough along which water flows at a rate greater than the rate of extrusion to the laces. The laces may be fed to a lace-cutter either before or after being dried. The system may be arranged as a self-threading system.

2 Claims, 7 Drawing Figures

FIG.4.

EXTRUSION PROCESS FOR AUTOMATICALLY THREADING LACES

RELATED APPLICATIONS

This application is a continuation of Ser. No. 653,149, filed Jan. 28, 1976 now abandoned; which in turn is a continuation of Ser. No. 473,269, filed May 24, 1974, now abandoned; which in turn is a continuation of Ser. No. 242,367, filed Mar. 10, 1972, now abandoned.

This invention relates to the extrusion of plastics materials especially thermoplastic materials and to a system for quenching such materials. By the term "plastics materials" in this specification there is included both plastics and plastics-containing compositions and by the term "thermoplastic materials" both thermoplastics and thermoplastics-containing compositions.

In the manufacture of many thermoplastic materials, the molten thermoplastic, optionally mixed with various additives such as plasticisers, stabilisers, anti-oxidants, impact modifiers, processing aids, lubricants, pigments, dyes, or fillers, is extruded in lace form and the laces are passed through a cooling bath and are then cut into granules by means of a lace-cutter, generally having rotary blades. The bath is usually in the form of a horizontally arranged tank containing water, a roller or rollers being mounted below the water surface at the end of the tank which receives the laces and also below the water surface further along the tank. When the extruder is started, or restarted after a breakage, the ends of the extruded laces are allowed to coalesce to form a clump and the clump has to be passed by hand underneath both sets of rollers. The clump is then cut off and the ends of the laces fed to a haul-off system at the other end of the tank in the form of nip rollers provided to draw the laces out of the tank and feed them to the lace-cutter.

Often, in order to provide a high output, a multi-lace extruder has been used wherein a number of laces are extruded together. Such multi-lace extruders can produce as many as 48 laces or more simultaneously. The threading of a multiplicity of laces round the rollers in the cooling bath creates problems on start up of the system since care has to be taken to stop adjacent laces sticking together and the control of each lace during threading to the cutting machine is difficult. Arrangements for start-up are therefore time-consuming and a considerable amount of scrap material can be formed during the start-up period. Furthermore, if one lace breaks, a blockage occurs in the cooling bath and the extruder has to be stopped, all the extruded material cleared from the bath, and the extruder has then to be restarted and the laces re-threaded. This is wasteful of time and material. If a breakage goes unnoticed for any length of time a serious build-up of material can occur in the bath which means it has to be emptied and then laboriously cleared of solidified thermoplastic material.

The nip rollers used in the haul-off system are normally made of rubber since harder rollers, for example rollers made of metal, either tend to flatten cylindrical laces and hence cause granules of oval cross-section, or else do not grip the lace sufficiently to provide adequate force to draw the laces through the bath and feed them to the lace-cutter. Some of the lace materials, especially those containing hard fillers, are abrasive and cause rapid wear of the rubber rollers which make necessary frequent replacement or refacing of the rollers and hence frequent wasteful stoppages and start-ups.

There has now been discovered a quenching system which enables the foregoing disadvantages to be reduced or overcome.

According to this invention there is provided a method of quenching a plastics material extrudate including extruding the plastics material from an extrusion die into an inclined trough, cooling the extrudate and carrying it away from the extrusion die by means of a stream of liquid e.g. water flowing down the trough at a linear rate greater than the initial linear rate of extrusion of the extrudate, and taking the extrudate from the lower end of the trough. By the term "initial linear rate of extrusion" there is meant the linear rate at which the material is extruded from the die before it contacts the liquid in the trough. By the term "quenching" there is intended the process of cooling the extrudate sufficiently to solidify it at least at the outer surface. The extent of the cooling and thus the quenching to be achieved by the process of the invention will depend on the treatment to which the extrudate is to be subjected after passing down the trough.

According to another aspect the invention provides a method of quenching a plastics material extrudate including the step of extruding the plastics material in a downward direction from a die through an air-gap towards a trough containing a cooling liquid, and exerting a deflecting force on the extrudate in the trough so that it is turned through an angle in the air-gap to meet the angle of the liquid surface. This preferably takes place without the need to pass the extrudate round a guide such as a roller, though it may be desirable in some cases to direct a liquid curtain or spray downwardly on to the extrudate as it comes out of the bend to meet the angle of the surface of the liquid in the trough. This is to help submerge the extrudate quickly. The ability of a newly formed extrudate end to follow a path similar to that followed by a previous extrudate on reaching the water in the trough and on being deflected enables the quenching process to continue despite breakages or intermittent extrusion. The angle through which the extrudate is turned in the air-gap is preferably between 70° and 90°.

There is further provided apparatus for cooling one or more plastics material extrudates comprising a trough, means for mounting the trough with one end higher than the other, means for supplying a liquid e.g. water to the higher end of the trough, and means for receiving the extrudate from the lower end of the trough.

The extrudate may be in the form of one or more strips, foils, films, monofils or laces, the strips etc being extruded in side by side relationship when there is more than one. The invention is particularly useful in its application to the quenching of an extrudate consisting of a number of laces extruded simultaneously from a multi-lace die.

The extrudate may be handled in various ways following the quenching step. The trough in which the quenching takes place may also be constructed and arranged in different ways. The invention may include further steps such as for example reeling up the extrudate or submitting it to a cutting operation either directly from the trough or after hauling it off and optionally further cooling and/or drying it. The invention also includes apparatus for conducting these further steps in combination with the apparatus above described.

Some preferred forms of trough and arrangements including them will be generally described and thereafter some particular embodiments illustrating the invention will be described with reference to the drawings. The liquid used in the trough for quenching will usually be water for reasons of convenience and economy. However other liquids may be suitable and references to water as the quench liquid should be considered as including reference to other suitable liquids.

In one form of trough applicable to the quenching of a number of simultaneously extruded monofils, laces or narrow strips (generally referred to as strands), the trough is divided into a number of separate channels, one for each of the separate strands, each channel carrying a stream of liquid to quench and carry away the strand. The channels should be wide enough to permit the strand to pass down them without contacting the sides at least until the surfaces of the strands are sufficiently solidified to overcome their tendency to stick to the sides. The channels may be of rectangular cross-section, that is to say with vertical sides, the bases being formed by the base of the trough which is flat. Alternatively the channels may be formed by corrugations in a sheet so that the individual channels are of V or U or similar cross section. An advantage of separate channels is that each strand can be quenched separately without contacting the other strands so avoiding the risk of adjacent strands sticking together once they have reached the trough. The liquid level in the channels should be adjusted so that it is below the tops of the sides of the channels so that even with an extrudate of density less than that of the liquid which therefore floats, the individual strands cannot cross from one channel to another and so stick together.

A second form of trough generally applicable to all the forms of extrudate mentioned above is not subdivided. It receives the extrudate whether this is in the form e.g. of a single film, lace or strip or in the form e.g. of a plurality of laces or strips and the extrudate is carried down the trough by the liquid stream. Preferably the base of the trough is flat and the walls of the trough are conveniently perpendicular to its base. Weir means may be provided at the upper end of the trough to ensure an even distribution of cooling liquid over the trough base.

It has been found that by suitable choice of linear flow rate and depth of cooling liquid e.g. water, it is possible to quench a large number of simultaneously extruded laces in this form of trough provided they are extruded to contact the liquid in the trough at laterally spaced points. The orifices in the die preferably lie on a straight line transverse to the axis of the trough though this is not essential provided the laces are laterally spaced from each other by reference to the trough axis so that by following the course natural to them on being contacted by the liquid in the trough, they pass down the trough in side by side relationship. Thus the die orifices may be arranged in a number of lines transverse to the trough axis provided the individual orifices are staggered with respect to each other.

Either of the two above described forms of trough may be used in some applications and certain preferred or optional features may be present in either form.

Thus in both cases the trough may lead directly to a lace-cutter which is mounted at the lower end of the trough to receive laces of thermoplastic material quenched by a water stream in the trough and cut them to desired lengths. A drying and cooling conveyor belt may be arranged to receive the cut lengths from the lace-cutter so that they are dried and cooled before being packed. Alternatively the lace may be passed into a continuously acting centrifuge and dried. In such embodiments of the invention the thermoplastic material may be extruded into the trough from an extruder with an appropriate die-head or may be extruded through a lace die connected to a valve beneath an autoclave.

Water recirculating means may be placed near to the lower end of the trough (e.g. beneath the mesh conveyor belt which receives the output of cut lace and the water from the lace-cutter), to collect the water which has passed down the trough and to enable it to be recirculated through a filter if necessary to the upper end of the trough by means of a pump.

In alternative embodiments of the invention, laces of thermoplastic material after a sufficient degree of quenching are passed from the lower end of the inclined trough carrying a water stream to a conveyor belt which allows them to dry and to cool further and acts as a haul-off means by conducting the laces to a lace-cutting machine. The conveyor speed should be faster than the rate of extrusion of the thermoplastic but need not be faster than the rate of water flow in the trough. Normally its speed is about the same as the rate of water flow. The conveyor is preferably in the form of a mesh or perforated belt which allows the water to pass through and which may conduct the laces under blower means which blows off the excess water through the mesh, cools the laces and helps to keep the laces in contact with the mesh. Water recirculating means may be placed below the mesh belt to receive water passing from the end of the trough and coming away from laces after they leave the trough, a pump being connected to a water recirculating tank to lead the water to the water feed at the upper end of the trough. In these embodiments also, the material may be extruded from an extruder or from an autoclave.

The conveyor belt can be replaced by a series of driven rollers, or in the case of systems which are not required to be self-threading by a series of non-driven rollers, provided haul-off means are arranged at the end of the non-driven rollers. Blower means may be used in conjunction with the rollers to provide drying and cooling.

Since the water stream in the trough moves faster than the laces as they are initially extruded, the laces are carried automatically to the end of the trough. The laces can therefore be automatically delivered to a lace-cutter at the end of the trough or to a conveyor belt to take them away to a cutter. The feed means, e.g. the nip rolls, of the cutter will then automatically take them up but will not need to grip the laces so tightly as the haul-off rollers of the prior form of cooling bath. The system is therefore self-threading, and the labour required at start-up can therefore be reduced to a minimum. If one lace breaks, it is found that material downstream of the break is carried through the system and the newly formed lace follows on without the need to stop the system and, usually, without the need to scrap any material. Considerable economies may therefore be effected in comparison with the previously described static bath system with submerged rollers. The ability of the system to deal with breakages in the laces automatically is particularly advantageous when the invention is being used in connection with material taken directly from an autoclave. As the polymer may be expelled from the autoclave with help of gas under pressure, it is possible that bubbles may be formed in the laces. This gives rise to blobbing in the laces and breakages which the system is able to deal with inexpensively in a way in which prior art systems would not be able to do.

Instead of passing the extrudate from the trough or from a conveyor belt or rollers to a cutter, the quenched extrudate may also if desired be reeled up in continuous lengths for storage. Alternatively they may be fed to a further processing operation for example a coating process.

The extrudate when in the form of narrow strips, monofils or laces may be hauled off from the end of the trough by venturi means through which air is passed to assist the haul off of the individual strands. This air stream can assist in drying, especially if, from the venturi, the strands are passed along a closed tube or tubes to a port or ports to which suction is applied before the strands enter a lace-cutter.

Water-operated venturi means may also be used with an inclined cooling trough, and a further aspect of the invention includes a method of quenching one or more strands of a plastics material (narrow strips, laces or monofils) comprising extruding each strand from an extrusion die into an inclined trough, cooling the strand and carrying it away from the extrusion die by means of a stream of liquid flowing down the trough at a linear rate greater than the initial linear rate of extrusion of the strand, and directing the strand or strands into water-operated venturi tube means into which water is injected to carry each strand away from the trough and to quench it further. The action of the venturi means may be to increase the effective rate of extrusion above the initial linear rate of extrusion and above the rate of flow of water in the trough.

This method may be applied to the quenching of thermoplastic materials, e.g. polyamides, which may be extruded through a die, e.g. a multilace die, fitted to an extruder or, alternatively through a multi-lace die fitted to a valve beneath an autoclave.

Where a number of laces are extruded, a separate venturi tube may be provided to receive each lace. Alternatively, a single venturi tube, preferably of an elongated cross-section, (the longer axis being horizontal) may receive and haul-off all of the laces, or a number of venturi tubes may be provided, each capable of handling more than one lace.

The invention also provides apparatus for quenching one or more strands of extruded plastics material comprising a trough, means for mounting the trough with one end higher than the other, means for supplying a liquid, e.g. water, to the higher end of the trough, water-operated venturi tube means to receive the extrudates from the lower end of the trough, and means for supplying the venturi tube means with water under pressure.

This apparatus will usually be used in conjunction with cutting means for cutting the extruded material into short lengths.

If desired nip rolls may be used in addition to or in place of the various types of haul-off means above described although, as previously noted, these are liable to wear especially when feeding laces of materials containing hard fillers. If used, the nip rolls may be spaced from the end of the trough so that the larger part of the quench liquid flowing down the trough may separate from the strands before they reach the nip rolls.

In the foregoing assemblies, it will be necessary for the trough to be wide at the receiving end if a large number of simultaneously extruded laces is to be quenched. If it is intended to mount a lace-cutter to receive laces coming directly from the trough or from a conveyor belt or roller system arranged at the end of the trough and the inlet of the lace-cutter is of smaller width than the width of the trough at its receiving end, it will be desirable to reduce the width of the trough by tapering it from its receiving (upper) end to its output (lower) end and this is preferably done uniformly down the length of the trough. The narrowing of the trough will depend on the requirements imposed on the apparatus. The ratio of the width at the wide end to that at the narrow end may e.g. be 2:1 and may be as high as 4:1. If the trough is subdivided into channels, the channels themselves will have to be tapered so that the trough as a whole is reduced to the required width.

The angle of inclination of the trough to the horizontal may be made adjustable, for example by pivoting one end and providing means to raise or lower the other end. Means may also be provided for adjusting the vertical height of the trough as a whole. The rate at which cooling liquid is provided to the upper end of the trough is also preferably adjustable. In these ways, the linear flow rate of the water and its depth in the trough can be varied to suit the particular extrusion conditions prevailing. Generally the linear water flow rate is in the range 0.3 to 5 meters per second, preferably 0.5 to 2 meters per second, and inclinations of the trough to the horizontal of 2° to 15° may be used.

Allowing for the inclination of the trough, the apparatus in its practical embodiments is essentially a horizontal arrangement and is thus suitable to use in replacement for existing water-bath systems using rollers and haul-off mechanism.

The extrudate is preferably extruded vertically downwards into the trough and is bent through almost 90° in the space between the die and the liquid stream. Such a system presents various advantages during start-up as will be subsequently explained. The system may also be installed without difficulty beneath the discharge point of an autoclave and this avoids the need to install the autoclave much higher in a building than it normally would be.

The invention may be used, inter alia for any extrudate of relatively small cross-section and small circumference, for example cylindrical laces. In general it is applicable to extrudates having a cross-section with a maximum dimension of 5 mm. The process is intended to quench the extrudate sufficiently to give adequate rigidity at the lower end of the trough for the extrudate either to be cut by a lace-cutter or to pass without substantial cross-sectional deformation to some form of conveyor or to be reeled up. Clearly, the time that any given plastics material will have to remain in the trough will depend on its extrusion temperature and quenching characteristics, other factors being equal, and it is found for example that to quench polyethylene laces, a longer trough is required than in the case of polyamides and polyethylene terephthalate.

The invention is of particular applicability in the production of extrudates and granules of thermoplastic compositions containing synthetic, polymeric materials such as polyolefines, particularly polyethylene (high and low density), propylene homopolymers and copolymers, 4-methyl pentene-1 polymers, vinyl chloride homopolymers and copolymers, polyethylene terephthalate, polyamides and polystyrene. It may be used in the production of glass-filled compositions such as glass-filled polypropylene and polyamides.

Various forms of the invention will be described with reference to the accompanying drawings wherein.

Figures 1, 3:
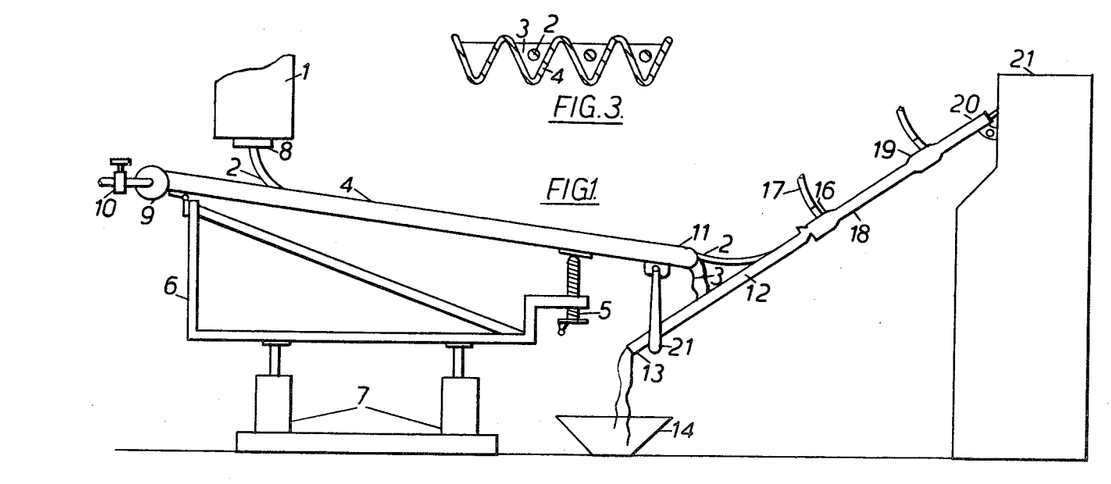
FIG. 1 is a diagrammatic longitudinal section of an extruder extruding laces into a quench system.
FIG. 3 is a cross-section along the line III—III of FIG. 2 showing the laces in the troughs.
Figure 2:
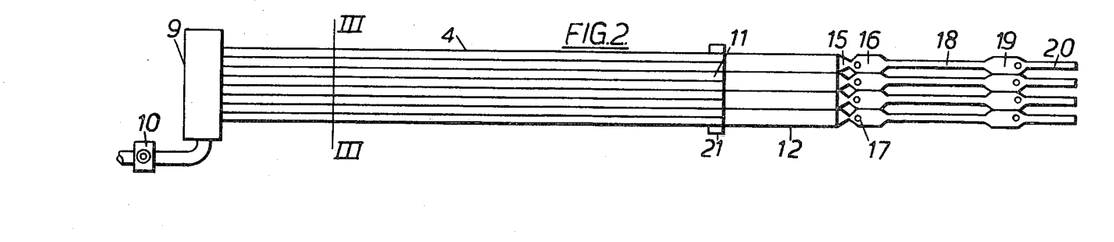
FIG. 2 is a plan of the apparatus shown in FIG. 1, omitting the extruder.

In FIGS. 1–3 there is shown an extruder 1 from which a number of 3 mm diameter laces 2 of, for example glass-filled polyamide, are melt extruded downwards towards a trough 4 which is subdivided into channels. In the drawings only 4 laces are shown for simplicity but any number may be used. Thus, for example, a die may be used producing 48 laces of diameter about 3 mm spaced in a line transverse to the apparatus at intervals of about 1.5 cm. Each lace is carried from the extruder by a stream 3 of water flowing down a 1.5 cm wide channel constituted between corrugations in the sheet which constitutes the trough 4. The level of the stream of water in each channel is below the peaks of the corrugations so that the laces cannot cross from one channel to another. The trough 4 is pivoted at the end nearer to the extruder and is inclined to the horizontal. The degree of inclination to the horizontal can be varied from 5° to 15° by means of a screw jack 5 operating between the trough 4 and a frame 6 on which the trough is mounted. The whole frame 6 with the trough 4 can be raised or lowered by means of jacks 7 so as to vary the distance between the die 8 of the extruder and the stream 3 of water. Water is fed to the upper end of the corrugated sheet, and hence to each trough, via a manifold 9 to which the water is supplied via a control valve 10. The linear flow rate of the water is adjusted so that it exceeds the initial linear rate of extrusion of the lace and so the lace is bent round almost through 90° and is carried away by the water stream and at the same time cooled. Typically the linear flow rate of the water is 1.5 m s$^{-1}$.

The lower end 11 of each channel is open and so the water stream drops from it, ejecting the laces into half round take-off guide pipes 12. The water drops from the end 11 of the trough into the pipes 12 at a point lower down from the point of contact between the laces and the pipes 12 and, since these pipes are inclined in the opposite sense to the trough, the water drains from the lower ends 13 of pipes 12 into a drain 14. The upper ends 15 of pipes 12 are conical so as to guide the laces 2 into venturi tubes 16 to which air is supplied from a supply pipe 17. The venturi forces the lace up a 6 mm diameter tube 18 in which is fixed a suction chamber 19 to remove water adhering to the lace. The take-off pipes 12, venturis 16 and tubes 18 are rigidly connected and the upper end 20 of tubes 18 is pivotally mounted. The take-off pipes 12 rest in a stirrup 21 suspended from the lower end 11 of trough 4, so that when the inclination of the trough 4, or its height, is varied, the take-off system constituted by take-off pipes 12, venturis 16 and tubes 18 pivots therewith.

Instead of providing a venturi 16 and pipe 18 for each lace, a single wide, flattened, venturi and pipe to accommodate all the laces can be used instead, or a number of such flattened venturis and pipes can be used, each one hauling off a number of laces.

The laces emerge from the upper ends 20 of tubes 18, and pass to the lace-cutter generally depicted by numeral 21.

At start-up after the initial scrap polymer has been extruded, the face of die 8 is scraped clean, while extrusion is in progress. By extrusion downwards, on clearing the die face, for example by merely sliding a scraper across it, the lace will extrude downwards under the action of gravity. If on the other hand, the lace is extruded horizontally, until it is hauled off, it may tend to adhere to and run down the die face. Thus when extruding vertically downwards, each lace first falls straight down to the trough wherein it is carried away by the water stream. On being ejected from the end of the trough, the lace engages with the take-off pipe 12 and is guided by the conical portion 15 of pipe 12 into the venturi 16. The water stream in the trough provides sufficient momentum to the lace to feed it to the venturi 16, whereupon the venturi gives any further momentum necessary, by virtue of the frictional forces between the airstream and the lace, to feed the lace up pipe 18 to the cutter 21.

The dwell time of the lace in the trough is naturally made long enough to permit a sufficient degree of cooling for the extrudate to enable it to pass satisfactorily to the pipe 12.

Figure 4:
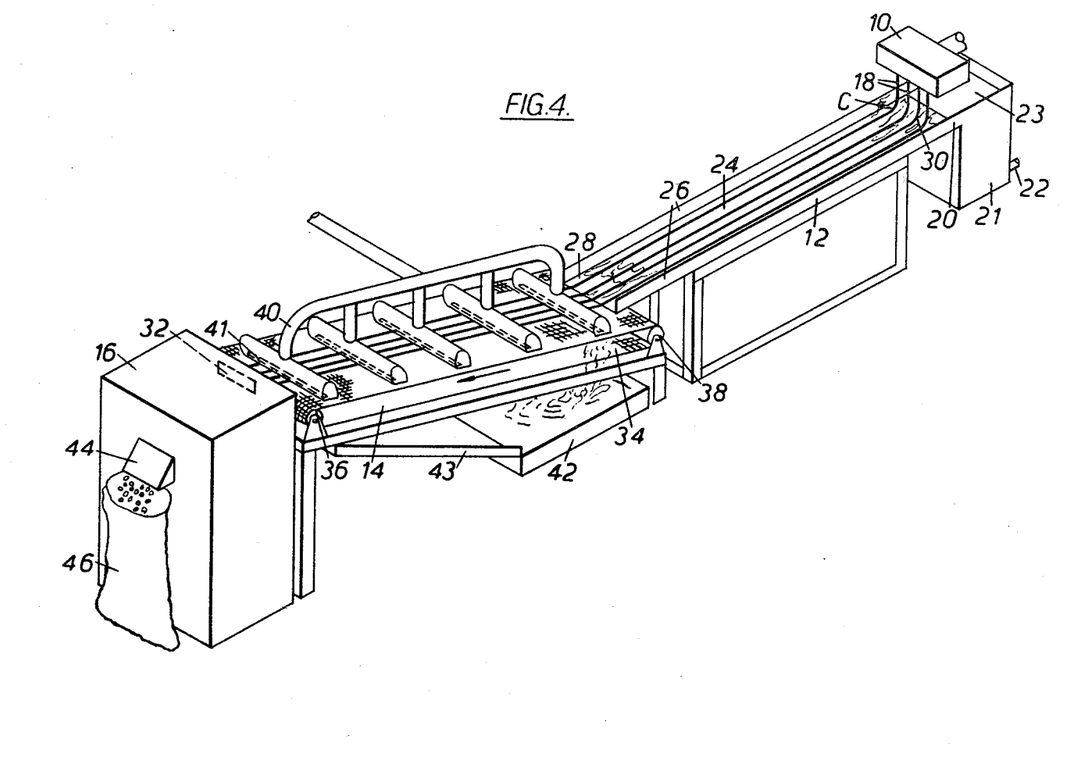
FIG. 4 is a perspective view of a die head of an extruder, a quenching system and a lace cutting machine.

Referring to FIG. 4, there is shown a die head 10 of an extruder, an inclined trough 12 to receive the extrudate, conveyor means 14 to receive the extrudate from the trough and a lace cutting machine 16.

The die-head 10 has 4 downwardly directed round orifices to extrude 4 cylindrical laces 18 vertically downwards towards trough 12. Although 4 laces are illustrated, a larger number may be used, for example up to 150 laces of diameter about 3 mm placed in a line transverse to the trough at intervals (centre to centre) of about 1.5 cm.

The material extruded may for example be a polyamide, polypropylene or polyethylene terephthalate.

Water to quench the laces and to carry them down the trough is provided to the upper end 20 of the trough by weir means 21 to which water is fed through pipe 22. The upper level of the water which flows over into the trough evenly across the width of the trough is shown at 23. This water may be cooled before being delivered to the weir means but normally is supplied at ambient temperature, other factors being varied to ensure that the required degree of quenching is obtained. The trough is preferably made of sheet metal and, as illustrated, has a flat base 24 between vertical side walls 26. The width of the trough is reduced uniformly from the upper end 20 to the lower end 28, the side walls 26 consequently converging in the direction of the lower end 28.

As the extruder is started up, a small amount of material extruded at the beginning is caught on a tray placed beneath the die. The die face is than cleared with a knife and individual laces allowed to form. As the leading ends of the laces reach the trough, they are contacted by a substantially uniform stream of water passing down the trough from the supply means 22 and are moved downstream by the water. The laces consequently bent to meet the angle of the base 24 of the trough and the dynamic condition once the laces have passed down the full length of the trough is indicated in the figure, the bend in the laces being shown at 30. On start-up, it is desirable that there should be an attendant to ensure that the laces become properly established in their flow down the channel, any unwanted lumps of material formed by individual laces or by adhesion of one lace to another being simply cut out by the attendant. It is found thereafter that by suitable choice of angle of the channel and rate of water supply that the laces move smoothly down the channel in side-by-side relation without clogging. It is of advantage that the base of the channel be made as smooth as possible with a minimum of interruptions shown as upward steps formed by the overlap of adjacent sheets of material from which the channel is made.

The width of the trough at the lower end 28 is chosen to correspond with the width of the inlet 32 of the lace-cutting machine 16. Between the trough and the inlet 32, the laces are carried by drying and cooling conveyor means 14. The conveyor means 14 includes a mesh conveyor belt 34 carried on rollers 36, 38, a blower means 40 having slits 41 which are open towards the laces 18 on the conveyor belt 34 and which direct knives of air on to the laces as they pass beneath the slits.

As the quench water flows from the end 28 of the trough, it passes downwardly through the mesh of the conveyor belt 34 and is received in a water recirculating tank 42. From here, the water is recirculated by pump means not shown to the supply means 22 after any necessary filtration.

The laces 18 leaving the end 28 of the trough pass on to the moving conveyor belt 34 and are moved upwardly to the inlet 32 of the lace-cutting machine. In passing under the blower means 40, water carried by the laces is blown off through the mesh conveyor towards the water recirculating tank 42 or a tray 43 inclined towards the tank and the air knives continue the drying by evaporation of surface water. At the same time, it cools the laces, further increasing the solidification of the thermoplastic. The air stream also serves to keep the laces in contact with the mesh belt.

On leaving the underside of the blower 40, the laces have been sufficiently solidified to enable them to be cut into granules by the lace-cutting machine 16 which is shown diagrammatically. The machine has an outlet 44 through which the granules are fed into containers, e.g. bags 46. Nip rolls or other take-up means of the lace cutter receive the laces. They accept the laces at the same or greater speed than that at which they are initially presented to the cutter. If the take-up means of the cutter hauls in the laces at a greater speed than that last mentioned, the rate of movement of the lace as a whole will be accelerated to the new speed and in this event the lace may be moved at a greater speed than that of the cooling liquid. This will not be disadvantageous because the lace will then be under the control of the cutter take-up means. Should a lace break, the speed of the new extrudate will revert to the original speed and as the liquid speed in the trough is greater, the new end will be carried to the cutter and will thread itself as before.

In some cases it is found that to obtain the desired quenching and avoid an uneven cross-sectional shape of lace it is necessary to provide means to submerge the laces quickly in the liquid in the trough as they leave the bend indicated at 30. This may be done conveniently by a water curtain directed substantially downwardly on to the laces as shown by the arrow C in FIG. 1.

Figure 5:
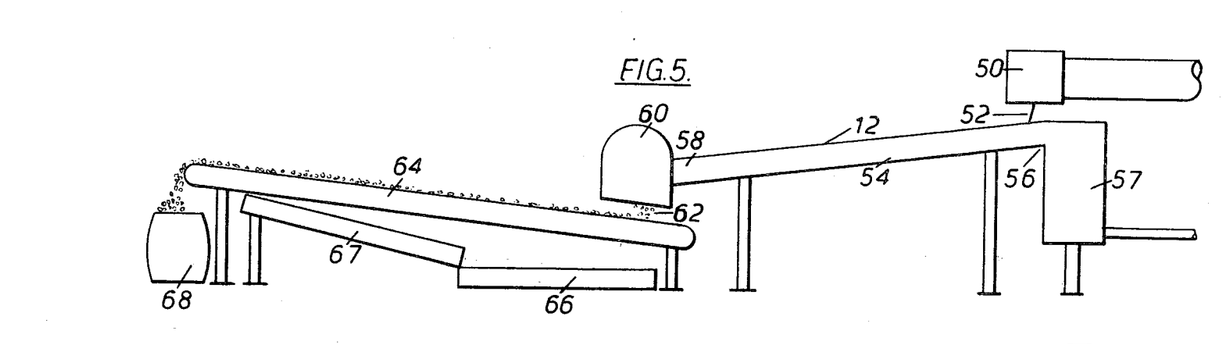
FIG. 5 is a diagrammatic elevational view of a die head of an extruder, quenching system, lace-cutter and conveyor means.

Referring to FIG. 5, there is shown an extruder diehead 50 from which laces 52 are extruded downwardly towards an inclined trough 54. Water is supplied to the upper end 56 of the trough from weir means 57 with supply pipe as shown and flows down to the lower end 58. The trough leads directly to the inlet of a lace-cutter 60 which receives the quenched laces and cuts them to granules 62 which fall on to a drying and cooling conveyor 64 having a mesh belt. The water from the trough passes with the extrudate through the lace-cutter and flows from the lace-cutter with the granules 62. The water passes through the mesh belt and is collected in a water recirculating tank 66 or tray 67 leading to the tank from whence it is recirculated through a filter if necessary and a pump to the supply pipe to the weir means 57. The granules 62 remain on the mesh belt and are carried upwardly and discharged into a container 68. In so doing the mesh allows water to drain from the granules which are therefore partially dried. An air blower may be mounted above the belt 64 to increase the effect of drying.

The arrangement illustrated in FIG. 5 may be used with any form of extrusion system, for example an extruder as illustrated, a continuous melting device or an autoclave.

Figure 6:
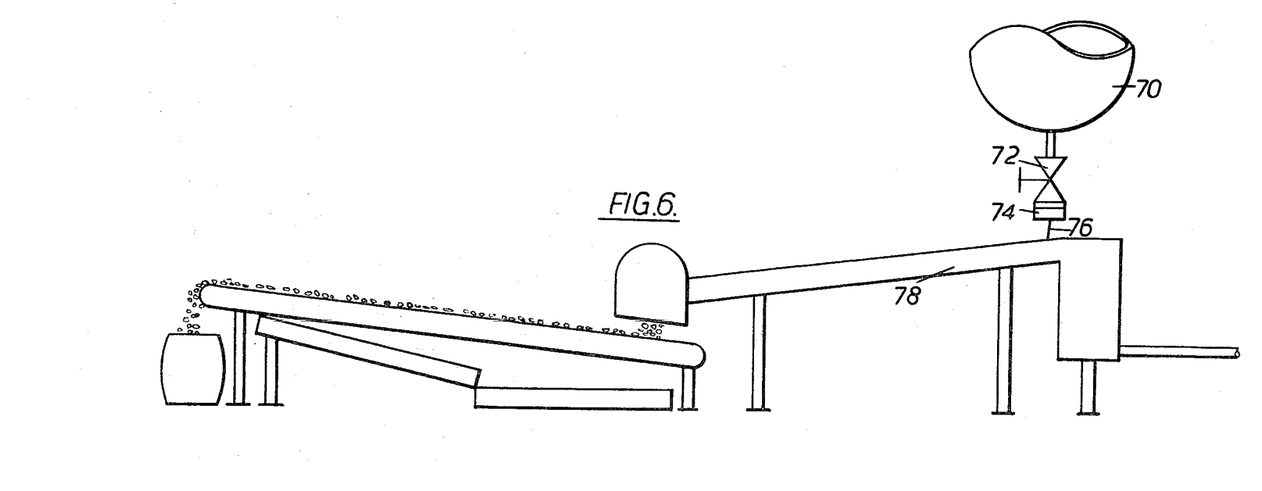
FIG. 6 is a diagrammatic elevational view of an arrangement for extruding material from an autoclave to a quenching system.

Extrusion from an autoclave is illustrated in FIG. 6 wherein molten thermoplastic from an autoclave 70 is discharged through a valve 72 to a die 74 from which laces 76 are extruded downwardly to a trough 78 forming part of a quenching system which may be similar to that illustrated either in FIG. 4 or in FIG. 5.

To deal with the large quantity of thermoplastic material which it is desired to take from an autoclave in a fairly short space of time, the die 74 is preferably made with a large number of orifices and in a typical case an 80 orifice die may be used, the orifices being arranged on a straight line at 1.27 cm centres. Thus the die may be slightly in excess of 101.6 cm in width the trough 56 at the upper end also being slightly wider than 101.6 cm and, appropriately, decreasing in width to approximately 25.4 cm just before a lace-cutter similar to cutter 60 in FIG. 5. Autoclave emptying systems such as this may be used for obtaining granules of polyamides and polyethylene terephthalate in a very simple and inexpensive manner from an autoclave discharge. This system has great advantages over the present system used on discharging an autoclave wherein the thermoplastic is discharged through a valve at the base of the autoclave to a slot die. The molten sheet emerging from the die is cooled by passing it round a large casting wheel which is sprayed with water. After passing part way round the wheel, the quenched sheet passes through a dicing machine. Known forms of dicing machine wear out quickly and create a great deal of noise which is inconvenient in factory premises. Also, the cylindrical form of cut-lace which may be produced by the present invention is preferred for some purposes to the cubes which are produced by a dicing machine.

Figure 7:
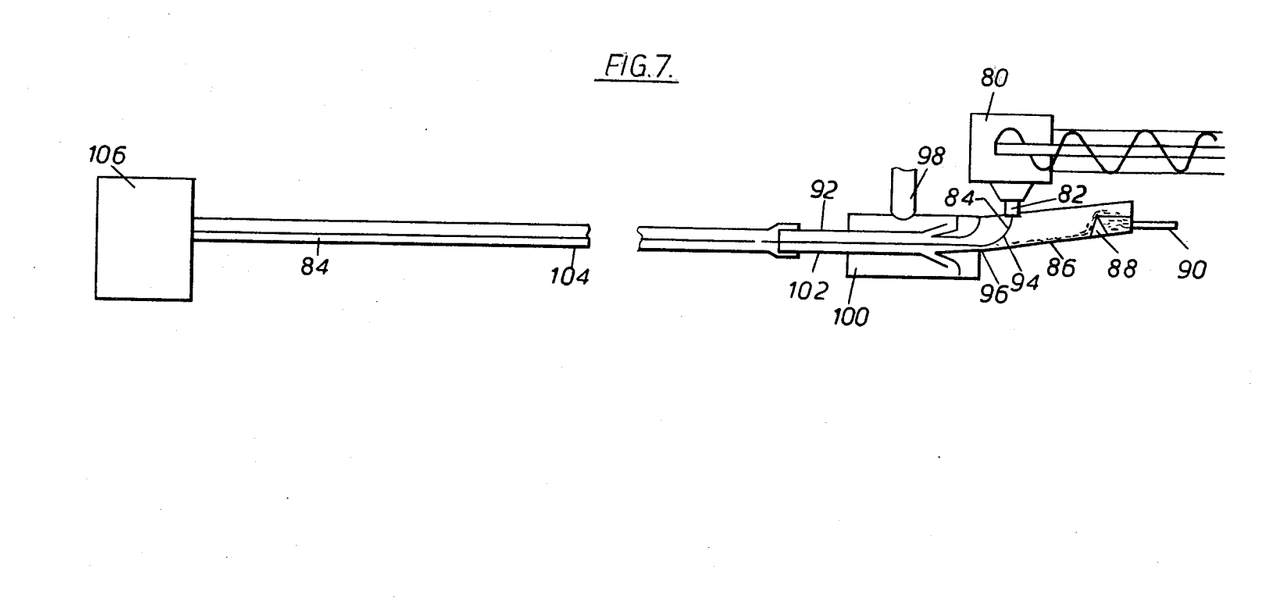
FIG. 7 is a diagrammatic sectional view of an extruder head and quench system incorporating venturi means.

Referring to FIG. 7, an extruder head 80 has a die 82 extruding a lace 84 of thermoplastic material downwardly into an inclined trough 86. In this example, the extruded material was a polyamide polymer. A weir plate 88 is provided towards the upper end of the trough and water is fed through the line 90 above the weir plate.

From the weir plate, a stream of water spreads evenly across the bottom of the trough, which is flat, and flows down the trough to a point underneath the die. Conveniently the bottom of the trough slopes at about $2\frac{1}{2}°$ to the horizontal, though the angle of slope and the rate of supply of water through the line 90 may be altered according to the type, dimensions and temperature of the extrudate. The extruded material contacts the water stream and is deflected by it and carried down the trough towards venturi tube means indicated generally at 92. In meeting the trough, the extruded material is turned through approximately 90° as indicated at 94 in the drawing. The water in the trough effects an initial quench of the extruded material which after passing down the trough enters the mouth 96 of the venturi means 92.

Water from a pipe 98 enters an injector 100 forming part of the venturi tube means and is forced under pressure into and down a tube 102 in the direction away from the trough 86. The tube 102 leads into a flexible tube 104 of a plastics material. The tube 104 leads to cutting means shown diagrammatically at 106.

The injected water, in passing down the tube 102, 104 takes up the extrudate and the water flowing from the trough 86 and carries the extrudate down the tubes effecting further quenching of the thermoplastic material at the same time. When, as in this example, the lace is fed directly to a cutter, the length of the tubes 102,104 and the speed at which the lace is carried down the tubes is regulated so that the lace is sufficiently quenched to enable it to be satisfactorily cut in the cutting means 106. Preferably, the water issuing with the extrudate from the tube 104 is recovered, filtered and recycled to the injector 100.

The speed at which the lace is drawn down the tubes is regulated by the pressure of the water fed to the injector 100. The distance between the die 82 and the mouth 96 of the venturi means is selected so that the lace is quenched sufficiently to enable it to be entrained without rupture or an unwanted degree of extension or other deformation by the water in the venturi. It is however advantageous not to quench the lace too much or else it may not be drawn easily into the venturi.

When more than one lace is to be quenched, a similar number of venturi means similar to that shown at 92 may be arranged at the end of the trough 86. Guides may be provided in the trough to guide each lace into the appropriate tube.

Instead of having separate venturi means for each extrudate when more than one extrudate is being quenched, venturi tubes of elongated cross-section may be used. A single tube system of this type may carry all the extrudates, or a number of such systems may be provided side by side, each system taking a number of extrudates.

I claim:

1. A method of granulating a thermoplastics material comprising extruding a melt of the thermoplastics material into a plurality of laces in side-by-side relationship through an air gap into the upper end of an inclined unsubmerged stationary cooling trough, providing a flow of water down the entire length of said trough so that the laces are carried down said trough by the water in side-by-side relationship and are quenched, passing the laces and water flow directly from the lower end of the trough to a lace cutting machine and cutting said laces to form granules in the lace cutting machine, the rate of flow of water being such that it exceeds the initial linear rate of extrusion of the laces and causes both any lace ends formed as a result of breakage of the lace or on commencement of extrusion and established laces to pass automatically down the trough and to be fed automatically with the water to the lace cutting machine.

2. A method according to claim 1 comprising directing a curtain of water downwardly on to the laces as they are extruded through the air gap to help submerge the laces in the water flowing down the trough.

* * * * *